US008738716B2

(12) United States Patent
Lu et al.

(10) Patent No.: US 8,738,716 B2
(45) Date of Patent: May 27, 2014

(54) SYSTEM AND METHOD FOR ROUTING INSTANT MESSAGES

(75) Inventors: Yan Lu, Shenzhen (CN); Lizhe Yao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 213 days.

(21) Appl. No.: 13/384,888

(22) PCT Filed: Jun. 30, 2010

(86) PCT No.: PCT/CN2010/074820
§ 371 (c)(1),
(2), (4) Date: Jan. 19, 2012

(87) PCT Pub. No.: WO2011/017987
PCT Pub. Date: Feb. 17, 2011

(65) Prior Publication Data
US 2012/0221655 A1    Aug. 30, 2012

(30) Foreign Application Priority Data

Aug. 14, 2009    (CN) .......................... 2009 1 0165670

(51) Int. Cl.
*G06F 15/16* (2006.01)
*G06F 15/173* (2006.01)
*H04J 3/06* (2006.01)
*H04J 3/16* (2006.01)

(52) U.S. Cl.
USPC ........... 709/206; 709/223; 709/229; 370/350; 370/466

(58) Field of Classification Search
None
See application file for complete search history.

(56) References Cited

U.S. PATENT DOCUMENTS

| 2007/0076751 | A1 | 4/2007 | Garcia-Martin et al. | |
|---|---|---|---|---|
| 2008/0281971 | A1* | 11/2008 | Leppanen et al. | 709/228 |
| 2009/0067408 | A1* | 3/2009 | Leppainen et al. | 370/350 |
| 2010/0128666 | A1* | 5/2010 | Masson et al. | 370/328 |
| 2013/0117457 | A1* | 5/2013 | Allen et al. | 709/227 |
| 2013/0232250 | A1* | 9/2013 | Lee et al. | 709/223 |

FOREIGN PATENT DOCUMENTS

| CN | 101147336 A | 3/2008 |
|---|---|---|
| CN | 101297532 A | 10/2008 |
| WO | 2008060088 A1 | 5/2008 |

OTHER PUBLICATIONS

"The Message Session Relay Protocol (MSRP)"; B. Campbell, Ed et al. Network Working Group; Cisco System, Inc. Sep. 2007, See pp. 1-63.
"Converged IP Messaging Architecture"; Draft Version 1.0—Oct. 4, 2007, Open Mobile Alliance, OMA-AD-CPM-V1_0-20071004-D; Open Mobile Alliance Ltd. All Rights Reserved, See pp. 1-37.

(Continued)

*Primary Examiner* — Wen-Tai Lin
(74) *Attorney, Agent, or Firm* — Ling Wu; Stephen Yang; Ling and Yang Intellectual Property

(57) ABSTRACT

A system and a method for routing an instant message which can refer to a Converged IP Messaging (CPM) message are provided. The instant message, for example, CPM message and the like, is sent to a plurality of terminals having the same user identification of the same user; in the case that the receiving party uses a plurality of terminals online simultaneously, the communication system such as a CPM system routes the instant message such as CPM message to a plurality of terminals respectively. Thereby, the problem of routing when forwarding an instant message such as a 'one number more machines" CPM message can be solved, further, the transmission of messages in the communication system such as the CPM system is realized better, and improving the user experience.

11 Claims, 3 Drawing Sheets

(56) References Cited

OTHER PUBLICATIONS

"SDP: Session Description Protocol"; M. Handley et al. Network Working Group; University of Glasgow, Jul. 2006, See pp. 1-49.

"OMA Converged IP Messaging System Description"; Draft Version 1.0—Mar. 12, 2009, Open Mobile Alliance, OMA-TS-CPM_System_Description-V1_0-20100312-D; Open Mobile Alliance Ltd. All Rights Reserved, See pp. 1-52.

"OMA Converged IP Messaging System Description"; Draft Version 1.0—Mar. 12, 2009, Open Mobile Alliance, OMA-TS-CPM_System_Description-V1_0-20100312-D; Open Mobile Alliance Ltd. All Rights Reserved, See pp. 53-113.

International Search Report for PCT/CN2010/074820 dated Sep. 18, 2010.

* cited by examiner

SYSTEM AND METHOD FOR ROUTING INSTANT MESSAGES

TECHNICAL FIELD

The present invention relates to communication field, in particular, to a system and method for routing an instant message which includes a converged IP messaging (CPM) message.

BACKGROUND OF THE RELATED ART

The application of instant message services become more and more widely. An instant message system determines a user uniquely by allocating different user identifications (or called accounts or addresses) to the users, and the user logs in, registers, and communicates mutually by using that user identification. In order to improve the user experience, more and more terminals (including mobile phone, individual PC, and the like) support the function of using one user identification to log in a plurality of terminals simultaneously. Taking the instant message service as an example, one user can have one user identification, and can log in, register and be online on various terminals simultaneously.

The CPM is proposed by the open mobile architecture (OMA) in 2005, the purpose of which is to realize the intercommunication among various messaging services, provide the unified messaging service for the user, and perfect the coincident and convenient messaging service experience. The CPM converges various existing messaging services, including the instant message (IM), the push-to-talk over cellular (POC), the mobile e-mail (MEM), the short messaging service (SMS), the multimedia messaging service (MMS) and so on.

The service forms of the CPM include: the CPM message based on pager-mode, the large message mode CPM message based on session-mode, other CPM session services based on session. The user needs to register and log in the CPM system, i.e. generally referring to "online" or available in the CPM system, before using these services normally. The pager mode CPM message and the large message mode CPM message can be regarded as one type of instant message, correspondingly, the CPM system can be regarded as a system for providing the instant message services.

The CPM address is the identification in the CPM system (can be called as a CPM enabler, i.e., CPM service enabler), which is used to distinguish the different users in the system. In order to improve the user experience, in the CPM system, one user can have a plurality of CPM addresses and can register on a plurality of terminal devices, that is to say, "online" at the same time, so that the user uses a plurality of terminals in different scenes respectively, each of the terminal devices may be used to support different service functions, for example, only support audio communication or support audio and video communication. If a certain user uses the same CPM address to log in the CPM system by different terminals, then, when the user is the receiving party of the CPM message and the CPM system sends the CPM message to the receiving party, and at that time if the receiving party has a plurality of receiving terminals being online simultaneously, it is still a problem not to be solved that the CPM message is routed to these terminals by which mechanism. At present, in a case that there is a plurality of user terminals online, and when a terminating participating function issues the CPM message (including the pager mode CPM message and the large message mode CPM message), there is a scheme proposing that a CPM application layer (relative to the SIP/IP core network) is responsible for forking of the CPM message and the SIP/IP core network does not participate in the forking process work; however, there is no specific technical scheme on how to route the CPM message to the plurality of terminals that meet receiving conditions, and there is also no specific technical scheme on how to route one instant message to the plurality of terminals that meet the receiving conditions.

CONTENT OF THE INVENTION

The problem solved by the present invention is to provide a system and a method for routing an instant message including a converged IP messaging message, to realize sending the instant message such as CPM message to a plurality of terminals having the same user identification of the same user.

In order to solve the above-mentioned problem, the technical scheme of the present invention may be implemented by ways of:

A method for routing a converged IP messaging message, comprising:

when a terminating participating function needs to send a pager mode CPM message to a plurality of receiving CPM clients, the terminating participating function sending a pager mode CPM message carrying a globally routable identification of the receiving CPM client to each receiving CPM client, and the pager mode CPM message being routed to the receiving CPM client through a SIP/IP core network;

wherein, the pager mode converged IP messaging message is the pager mode CPM message.

The pager mode CPM message sent by the terminating participating function is a real-time received pager mode CPM message from a sending party, or a non real-time pager mode CPM message.

The terminating participating function obtains the globally routable identification of the receiving CPM client by any one of the following ways of:

(a) after the SIP/IP core network receives a registration message sent by the receiving CPM client, allocating the globally routable identification for the receiving CPM client, and forwarding the registration message carrying the globally routable identification allocated for the receiving CPM client to the terminating participating function;

(b) the terminating participating function requesting to subscribe registration states of users by sending a subscription message to the SIP/IP core network, and the SIP/IP core network, after receiving the subscription message, sending a subscription notification message to the terminating participating function; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The way of the pager mode CPM message carrying the globally routable identification by the terminating participating function is:

for each pager mode CPM message to be sent, the terminating participating function setting a field value of a request universal resource identifier in the pager mode CPM message to the globally routable identification of the receiving CPM client.

The globally routable identification is a globally routable user agent universal resource identifier.

A method for routing a converged IP messaging message comprises:

when a terminating participating function needs to send a session invite message of a large message mode converged IP messaging message, CPM message, to a plurality of receiving CPM clients, sending a session invite message carrying a globally routable identification of the receiving CPM client to each receiving CPM client, and the session invite message being routed to the receiving CPM client through a SIP/IP core network;

each receiving CPM client that receives the session invite message achieving a session description protocol negotiation with the terminating participating function, and establishing a message session relay protocol, MSRP, medium transmission path to the terminating participating function;

the terminating participating function sending message content of a large message mode CPM message to each receiving CPM client through the respective MSRP medium transmission path;

wherein, the large message mode converged IP messaging message is the large message mode CPM message.

The terminating participating function obtains the globally routable identification of the receiving client by any one of the following ways of:

(a) after the SIP/IP core network receives the registration message sent by the receiving CPM client, allocating the globally routable identification for the receiving CPM client, and forwarding the registration message carrying the globally routable identification allocated for the receiving CPM client to the terminating participating function;

(b) the terminating participating function requesting to subscribe registration states of users by sending a subscription message to the SIP/IP core network, and the SIP/IP core network, after receiving the subscription message, sending a subscription notification message to the terminating participating function; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The way of the session invite message of the large message mode CPM message carrying the globally routable identification by the terminating participating function is:

for each session invite message to be sent, the terminating participating function setting a field value of a request universal resource identifier in the session invite message to the respective globally routable identification of the receiving CPM client.

A system for routing a converged IP messaging message, comprises a terminating participating function, a plurality of receiving CPM clients and a SIP/IP core network; wherein:

the terminating participating function is configured to, when a pager mode CPM message needs to be sent to the plurality of receiving CPM clients, send a pager mode CPM message carrying a globally routable identification of the receiving CPM client to each receiving CPM client;

the SIP/IP core network is configured to route the received pager mode CPM message to the receiving CPM client;

the pager mode converged IP messaging message is the pager mode CPM message.

The pager mode CPM message sent by the terminating participating function is a real-time received pager mode CPM message from a sending party, or a non real-time pager mode CPM message.

The SIP/IP core network is further configured to, after receiving a registration message sent by the receiving CPM client, allocate the globally routable identification for the receiving CPM client, and forward the registration message carrying the globally routable identification allocated for the receiving CPM client to the terminating participating function;

the terminating participating function is further configured to obtain the globally routable identification of the receiving CPM client from the received registration message.

The terminating participating function is further configured to send a subscription message to the SIP/IP core network to request to subscribe registration states of users, and obtain the globally routable identification of the CPM client from a received subscription notification message;

the SIP/IP core network is further configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The pager mode CPM message carrying the globally routable identification by the terminating participating function is:

for each pager mode CPM message to be sent, the terminating participating function setting a field value of a request universal resource identifier in the pager mode CPM message to the globally routable identification.

A system for routing a converged IP messaging message, comprises a terminating participating function, a plurality of receiving CPM clients and a SIP/IP core network; wherein:

the terminating participating function is configured to, when a session invite message of a large message mode CPM message needs to be sent to the plurality of receiving CPM clients, send a session invite message carrying a globally routable identification of the receiving CPM client to each receiving CPM client; and further configured to send message content of a large message mode CPM message to each receiving CPM client through respective message session relay protocol, MSRP, medium transmission path;

the SIP/IP core network is configured to route the received session invite message to the receiving client;

the receiving client is configured to, after receiving the session invite message, achieve a session description protocol negotiation with the terminating participating function and establish the MSRP medium transmission path;

the large message mode converged IP messaging message is the large message mode CPM message.

The SIP/IP core network is further configured to, after receiving a registration message sent by the receiving CPM client, allocate the globally routable identification for the receiving CPM client, and forward the registration message carrying the globally routable identification allocated for the receiving CPM client to the terminating participating function;

the terminating participating function is further configured to obtain the globally routable identification of the receiving CPM client from the received registration message.

The terminating participating function is further configured to send a subscription message to the SIP/IP core network to request to subscribe registration states of users, and obtain the globally routable identification of the CPM client from a received subscription notification message;

the SIP/IP core network is further configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The session invite message of the large message mode CPM message carrying the globally routable identification by the terminating participating function is:

for each session invite message to be sent, the terminating participating function setting a field value of a request universal resource identifier in the session invite message to the respective globally routable identification of the receiving CPM client.

A method for routing an instant message comprises:

when an instant message server needs to send the instant message to a plurality of receiving clients, the instant message server sending an instant message carrying a globally routable identification of the receiving client to each receiving client, and the instant message being routed to the receiving client through a SIP/IP core network.

A method for routing an instant message comprises:

when an instant message server needs to send a session invite message to a plurality of receiving clients, the instant message server sending a session invite message carrying a globally routable identification of the receiving client to each receiving client, and the session invite message being routed to the receiving client through a SIP/IP core network;

each receiving client that receives the session invite message achieving a session description protocol negotiation with the instant message server, and establishing a message session relay protocol, MSRP, medium transmission path to the instant message server;

the instant message server sending content of an instant message to each receiving CPM client through the respective MSRP medium transmission path.

A system for routing an instant message comprises an instant message server, a plurality of receiving clients and a SIP/IP core network; wherein:

the instant message server is configured to send an instant message carrying a globally routable identification of the receiving client to each receiving client when the instant message needs to be sent to the plurality of receiving clients;

the SIP/IP core network is configured to route the received instant message to the receiving client.

To sum up, a method and a system for routing an instant message including a converged IP messaging message are provided by the present invention, and used to send an instant message such as CPM message to a plurality of terminals having the same user identification of the same user; in the case that the receiving party uses a plurality of terminals online simultaneously, the communication system such as a CPM system routes the instant message such as CPM message to a plurality of terminals respectively. Thereby, the problem of routing when forwarding an instant message such as a 'one number more machines" CPM message can be solved, further, the transmission of messages in the communication system such as the CPM system is realized better, and improving the user experience.

The technical scheme described in the present invention is applied to not only the multi-terminal routing of the CPM message system, but also other instant messages that have the same instantaneity with the CPM message, such as the instant message system based on the IMS or other instant message systems based on SIP protocol.

The terminal mentioned in the present invention refers to a physical entity which runs an instant message client, and in general, one physical entity could run one instant message client; therefore, sending a message to a certain terminal means sending the message to an instant message client running in that terminal.

PREFERRED EMBODIMENTS OF THE PRESENT INVENTION

Figure 1:
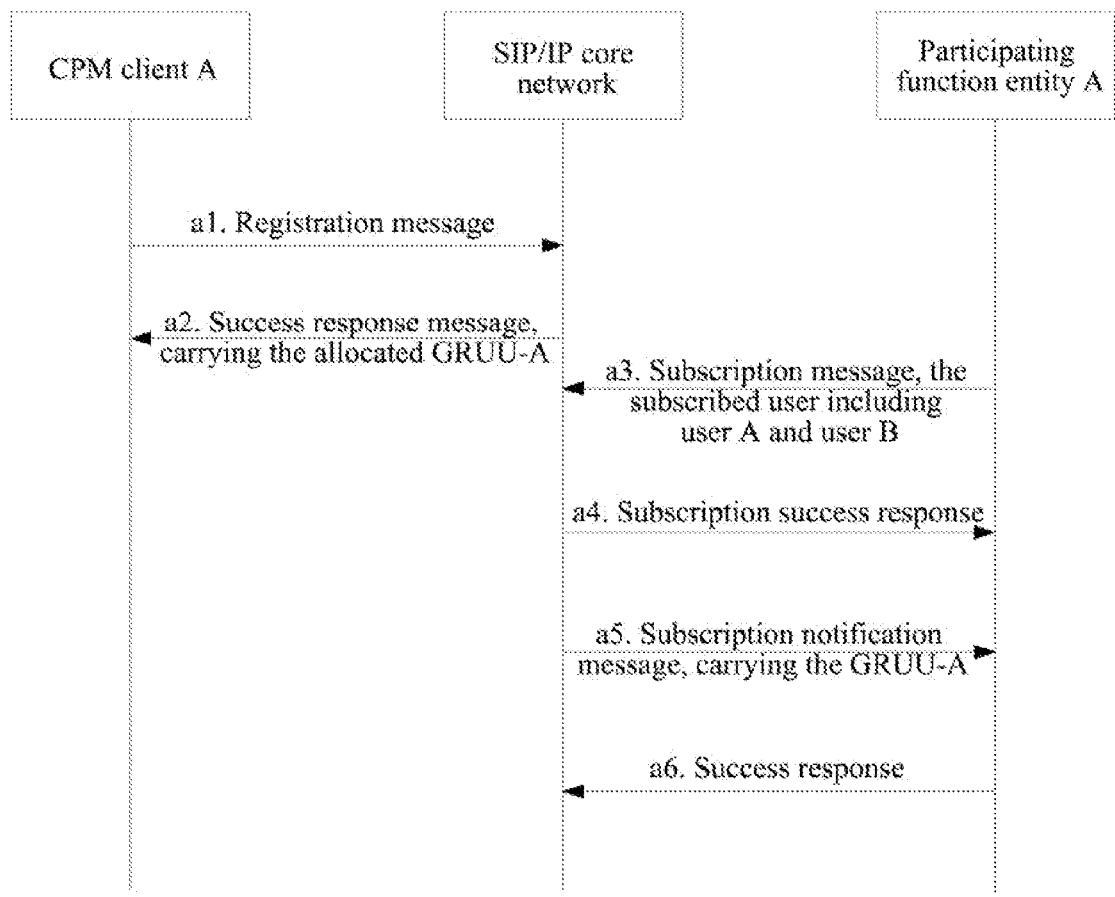
FIG. 1 is a flowchart of a method (a) of a terminating participating function obtaining a globally routable identification of a CPM client according to the present invention.
Figure 2:
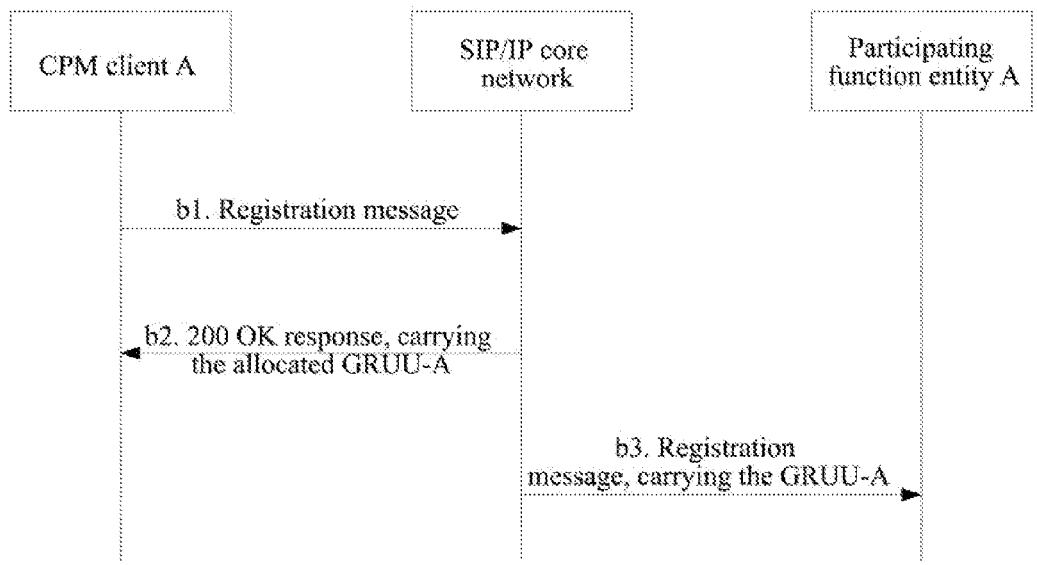
FIG. 2 is a flowchart of a method (b) of a terminating participating function obtaining a globally routable identification of a CPM client according to the present invention.

A system and a method for routing an instant message including the converged IP message are provided in the present invention. Except the converged IP message, the technical scheme of the present invention is also able to apply to other instant message systems that have the same instantaneity with the converged IP messaging system, such as the instant message system based on IMS or other instant message systems based on SIP protocol.

In the specific application, the instant message server can be a service system composed of one or more function entities. In general, the entity which implements all of the instant message service functions of the network side (relative to the client) can be regarded as the instant message server. In the CPM system, the instant message client is a CPM client, the instant message is the CPM message in the CPM system, i.e., the pager mode message or the large message mode CPM message in the CPM system, and the instant message server can include a participating function and a controlling function of the CPM system, and so on. In an IMS system, the SIP/IP core network is the IMS core network, and the instant message server is the instant message application server (AS) in the IMS system.

Additionally, the present invention is also applicable to other instant message systems based on the SIP protocol. The instant message architecture of the present invention is the architecture that is based on the SIP/IP core network. Under some network environments, the SIP/IP core network may be a function unit integrated with the instant message application server, and the present invention is also applicable to that case of networking.

Only the converged IP message is described as an example of the routing technique of the present invention bellow, and the principle of the routing technique for the application of other instant messages is similar to the following content.

In the specific application, the user of the receiving party can use one CPM address to register on different terminals by the CPM client to be online. The participating function to which the receiving party belongs, i.e., the terminating participating function (PF-B), when issuing the CPM message, firstly screens a plurality of receiving CPM clients according to a screening rule, and selects the receiving CPM clients of the CPM message which meet the receiving condition from the plurality of the CPM clients, and then sends a CPM message that carries the globally routable identification respectively regarding to each selected receiving CPM client. When the message passes through the SIP/IP core network, the SIP/IP core network will not perform the forking process on the message again according to the globally routable identification included in the message.

System Embodiments

Embodiment 1

A system for routing the converged IP message is provided by the present embodiment, and the system includes: the terminating participating function, a plurality of receiving CPM clients and the SIP/IP core network;

the terminating participating function is configured to, when the pager mode CPM message needs to be sent to a plurality of receiving CPM clients that meet the receiving condition, send a pager mode CPM message carrying a globally routable identification of the receiving CPM client to each receiving CPM client which meets the receiving condition;

the SIP/IP core network is configured to route the received pager mode CPM message to the receiving CPM client.

The pager mode CPM message sent by the terminating participating function is a real-time received pager mode CPM message from a sending party, or a non real-time pager mode CPM message.

The SIP/IP core network is also configured to, after receiving a registration message sent by the receiving CPM client, allocate the globally routable identification for the receiving CPM client, and forward the registration message carrying the globally routable identification allocated for the receiving CPM client to the terminating participating function;

the terminating participating function can also be configured to obtain the globally routable identification of the receiving CPM client from the received registration message.

The terminating participating function can also be configured to send a subscription message to the SIP/IP core network to request to subscribe registration states of users; and can also be configured to obtain the globally routable identification of the CPM client from the received subscription notification message;

the SIP/IP core network can also be configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The pager mode CPM message carrying the globally routable identification by the terminating participating function is that: for each pager mode CPM message to be sent, the terminating participating function sets a field value of a Request-URI (universal resource identifier) in the pager mode CPM message to the globally routable identification.

Embodiment 2

A system for routing the converged IP message is provided by the present embodiment, and the system includes: the terminating participating function, a plurality of receiving CPM clients and the SIP/IP core network;

the terminating participating function is configured to when the session invite message of the large message mode converged IP messaging message (CPM message) needs to be sent to a plurality of receiving CPM clients which meet the receiving condition, and send a session invite message carrying the globally routable identification of the receiving CPM client to each receiving CPM client that meets the receiving condition; and further configured to send message content of a large message mode CPM message to each receiving CPM client through respective MSRP medium transmission path;

the SIP/IP core network is configured to route the received session invite message to the receiving client;

the receiving client is configured to, after receiving the session invite message, achieve a SDP (session description protocol) negotiation with the terminating participating function and establish the MSRP medium transmission path.

The SIP/IP core network is also configured to, after receiving a registration message sent by the receiving CPM client, allocate the globally routable identification for the receiving CPM client, and forward the registration message carrying the globally routable identification allocated for the receiving CPM client to the terminating participating function;

the terminating participating function can also be configured to obtain the globally routable identification of the receiving CPM client from the received registration message.

The terminating participating function can also be configured to send a subscription message to the SIP/IP core network to request to subscribe registration states of users; and can also be configured to obtain the globally routable identification of the CPM client from the received subscription notification message;

the SIP/IP core network can also be configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

The session invite message of the large message mode CPM message carrying the globally routable identification by the terminating participating function is that: for each session invite message to be sent, the terminating participating function sets the field value of the Request-URI in the session invite message to the respective globally routable identification of the receiving CPM client.

Method Embodiments

Embodiment 1

A method for routing the pager mode CPM message to a plurality of clients is provided by the present embodiment, and the method includes the following steps:

step S101: the terminating participating function needs to send the received pager mode CPM message to the receiving CPM client, and determines the number of the receiving CPM clients that meet the receiving condition is plural, that is to say, needs to send the pager mode CPM message to a plurality of online receiving CPM clients;

the pager mode CPM message sent by the PF-B can be a real-time received pager mode CPM message from a certain sending party, or a pager mode CPM message sent in non real time in the case of meeting the condition (e.g., he receiving client changes from unavailable to available)—i.e. deferred pager mode CPM message. Before the pager mode CPM message is sent to the receiving party, the PF-B may screen a plurality of online clients of the receiving party according to the preset screening rule, such as factors of the caller preference parameter, user configuration strategy, operator strategy and the ability of each receiving client, and so on. In the embodiment, it is assumed that the obtaining receiving party that meets the preset screening condition is at least two CPM clients.

Step S102: for each CPM client that meets the receiving condition, the terminating participating function sends the pager mode CPM message, wherein a globally routable identification of the receiving CPM client is carried in each pager mode CPM message, and each pager mode CPM message is routed to each receiving CPM client through the SIP/IP core network.

Each of the receiving CPM clients provides the globally routable identification of the client, such as, globally routable user agent (UA) URIs (GRUU), to the PF-B by the procedure of registering of the step S101. The globally routable identification of the terminal is carried in the pager mode CPM message sent to each client, and when that message passes through the SIP/IP core network, the SIP/IP core network does not perform the forking process on the message according to the carried globally routable identification, thereby realizing the forking process in the CPM service layer.

If the number of the CPM clients that meet the receiving condition is one, the PF-B can also set the field value of the Request-URI in the pager mode message of that client to the GRUU of the client, and the SIP/IP core network routes the pager mode message to the client according to the GRUU.

Embodiment 2

A method for routing the large message mode CPM message to a plurality of terminals is provided by the present embodiment, and the method includes the following steps:

step S201: the terminating participating function needs to send the received large message mode CPM message to the receiving CPM client, and determines the number of the receiving CPM clients that meet the receiving condition is plurality according the receiving condition, that is to say, needs to send the large message mode CPM message to a plurality of online receiving CPM clients;

the large message mode CPM message sent by the PF-B can be a real-time received CPM message from a certain sending party, or a non real-time large message mode CPM message. First, the session invite message of the large message mode CPM message is sent, and before the session invite message is sent to the receiving party, the PF-B may screen a plurality of online clients of the receiving party according to the preset screening rule, such as factors of the caller preference parameter, user configuration strategy, operator strategy and the ability of each receiving party terminal, and so on. In the embodiment, it is assumed that the obtaining receiving party that meets the preset screening condition is at least two terminals.

Step S202: for each CPM client that meets the receiving condition, the terminating participating function sends the session invite message of the large message mode CPM message, and a globally routable identification of the receiving CPM client is carried in each session invite message, and each session invite message is routed to each receiving CPM client through the SIP/IP core network.

According to existing criterion, a large message mode CPM message transmission path is divided into a signaling path and a medium path, that is, the signaling is transmitted along the signaling path, the medium is sent along the medium path. When the large message mode CPM message is transmitted, a session between the sending CPM client and the receiving CPM client is established using a session invite message (INVITE) of the large message mode CPM message, to achieve the SDP negotiation and establish the transmission link between the sending CPM client and the receiving CPM client, and the medium content of the large message mode CPM message, i.e. the content of the CPM message, is transmitted to the above-mentioned receiving CPM client by using a message session relay protocol (MSRP) through the established transmission link.

If the number of the CPM clients that meet the receiving condition is one, the PF-B can also set the field value of the Request-URI in the session invite message of the large message mode CPM message to the GRUU of the client, and the SIP/IP core network routes the invite message to the client according to the GRUU.

Step S203, each CPM client receiving the session invite message achieves the SDP (session description protocol) negotiation with the terminating participating function by the session invite message and the response message thereof, and establish the MSRP medium transmission path to the terminating participating function respectively;

step S204: the terminating participating function sends message content of a large message mode CPM message to each CPM client through the MSRP medium transmission path established with each CPM client.

Before the above step S101 and the step S201, the terminating participating function needs to obtain the globally routable identification of the receiving CPM client, such as public globally routable identification, i.e. public GRUU; the way of which may be, but not limited to, any one of the following ways:

(a) the participating function obtain the registration state information of the CPM client through subscribing the registering state, thereby obtaining the public globally routable identification of each CPM client;

step a1: the CPM client A sends a registration message to the SIP/IP core network of the CPM system, wherein the registration message carries a 'gruu' parameter by a Supported header field and a Require header field and carries a respective client identification by a Contact header field; and can request the SIP/IP core network to allocate the globally routable identification for it;

step a2: the SIP/IP core network, after receiving the registration message, allocates the globally routable identification (recorded as GRUU-A) for the CPM client A, and returns a success response message to the CPM client;

step a3: the participating function belonging to the CPM client A (recorded as PF-A) sends a subscription message to the SIP/IP core network, wherein, it is indicated in the subscription message that the subscription is for "registration state" and the registration states of which users are subscribed, and it is assumed that the users subscribed by the PF-A include user A and user B;

step a4: the SIP/IP core network returns a subscription success response to the PF-A;

there is no limitation to the order of the executions of the step a1 and the step a3;

step a5: the SIP/IP core network sends a subscription notification message to the PF-A, if the registered user client exists in the users subscribed by the PF-A, such as CPM client A, the subscription notification message carries the globally routable identification GRUU-A allocated for the CPM client A;

step a6: the PF-A returns a success response to the SIP/IP core network.

If the unregistered user client exists in the subscribed users, after the unregistered user client registers, the SIP/IP core network sends a subscription notification message carrying a GRUU of that registered user client to the PF-A. Therefore, the PF-A can obtain the GRUU of the user client from the SIP/IP core network, if only the user client requested for subscription by the PF-A is registered.

The above GRUU may be a public GRUU;

the globally routable identification obtained by the participating function may be obtained from a sub-tag <pub-gruu> of an XML document tag <registration> included in the message body of a registration event notification message.

(b) the user registers in the CPM system through the CPM client and by using the same CPM address at a plurality of terminals;

step b1: the registration message sent by the CPM client A of the user to the SIP/IP core network includes a Supported header field which carries a 'gruu' parameter, indicating that the terminal supports an extended alternative parameter SIP GRUU; and the registration message also includes a Require header field which carries the 'gruu' parameter, indicating that the network side must support the extended alternative parameter SIP GRUU.

Step b2: the SIP/IP core network, after receiving the registration message, allocates the globally routable identification (recorded as GRUU-A) for the CPM client A, and returns a 200 OK response message carrying the GRUU-A to the CPM client A; this identification may be a public GRUU of the CPM client, i.e. public GRUU.

Step b3: the SIP/IP core network forwards the registration message carrying the GRUU-A allocated for the CPM client A to the participating function A to which the CPM client A belongs;

the GRUU obtained by the participating function can be obtained from the header From or To of the registration message, or can be obtained from a Contact header field.

The embodiments take the CPM sending the large message for example. Due to sending other medium content such as document is the same as sending the large message, the solution provided by the present invention is also applied in the case that the SIP session is used as the signaling plane and the MSRP is used as the medium plane to transmit other medium content.

The present invention will be further described by several application examples below.

In the following two application examples, the CPM terminal used by the user A is recorded as Device-A, and the CPM client built in the Device-A is recorded as the CPM client A; it is assumed that the CPM address Addr-A is one CPM address of the user A, and that CPM address belongs to the participating function A (recorded as PF-A);

the user B registers in the CPM system by two different terminals respectively using the same CPM address, wherein, the two CPM terminals are respectively recorded as Device-B1 and Device-B2, the CPM client built in the Device-B1 is recorded as the CPM client B1, and the CPM client built in the Device-B2 is recorded as the CPM client B2; and the CPM address belongs to the CPM participating function B (recorded as PF-B).

The PF-B can obtain the GRUUs of both of the CPM client B1 and the CPM client B2 of the user B by using the above-mentioned way (a) or (b).

Application Example One

Figure 3:
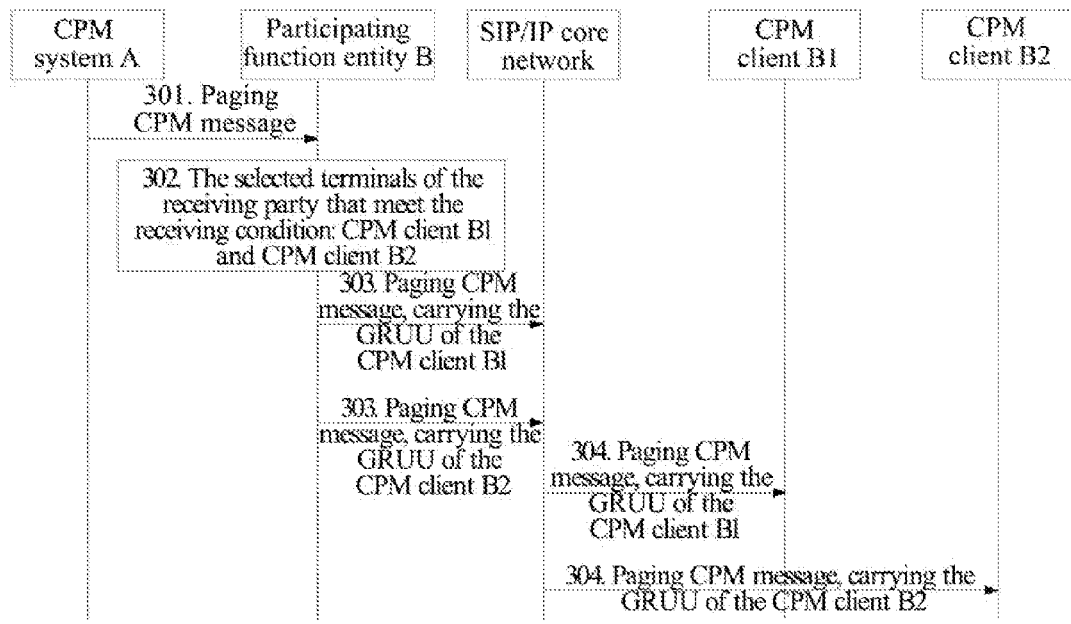
FIG. 3 is a flowchart of a method for routing a pager mode CPM message according to an embodiment of the present invention.

In this example, taking the user A sending a pager mode CPM message to the user B for an example, the CPM participating function to which the receiving party belongs performs the forking process on the received CPM message; and as shown in FIG. 3, the example includes the following steps:

step S301: the user A in the CPM system sends the pager mode CPM message to the user B.

Specifically, the user A sends the pager mode CPM message to the user B by the CPM client A in the terminal Device-A by using the Addr-A.

Step S302: the PF-B, after receiving the above-mentioned pager mode CPM message, performs the screening process on the receiving CPM clients according to the receiving condition, and finally selects the receiving party terminals, the CPM client B1 and the CPM client B2, that meet the receiving condition;

step S303: the PF-B sends the pager mode CPM message to the CPM client B1 and the CPM client B2;

specifically, the pager mode CPM message sent to the CPM client B1 by the PF-B carries the GRUU of the CPM client B1, and the pager mode CPM message sent to the CPM client B2 by the PF-B carries the GRUU of the CPM client B2;

the way of the pager mode CPM message carrying the GRUU may be, but not limit to, setting the field value of the Request-URI (request universal resource identifier) in the pager mode CPM message to GRUU.

Step S304: the SIP/IP core network receives the pager mode CPM message sent by the PF-B, due to the field Request-URI carrying the GRUU, the SIP/IP core network no longer performs the forking process on that message, but sends the pager mode CPM message carrying the GRUU of the CPM client B1 to the CPM client B1, and sends the pager mode CPM message carrying the GRUU of the CPM client B2 to the CPM client B2.

In the application example, when the terminating participating function sends a deferred message, the same solution may be applied in the case of a plurality of receiving CPM clients. Additionally, the user A sends the pager mode CPM message to a certain group (including a preset group and a temporary group), and if the group includes a user B and the user B has a plurality of terminals meeting the receiving condition, obviously the terminating participating function to which the user B belongs can process the pager mode message by using the above solution.

Application Example Two

Figure 4:
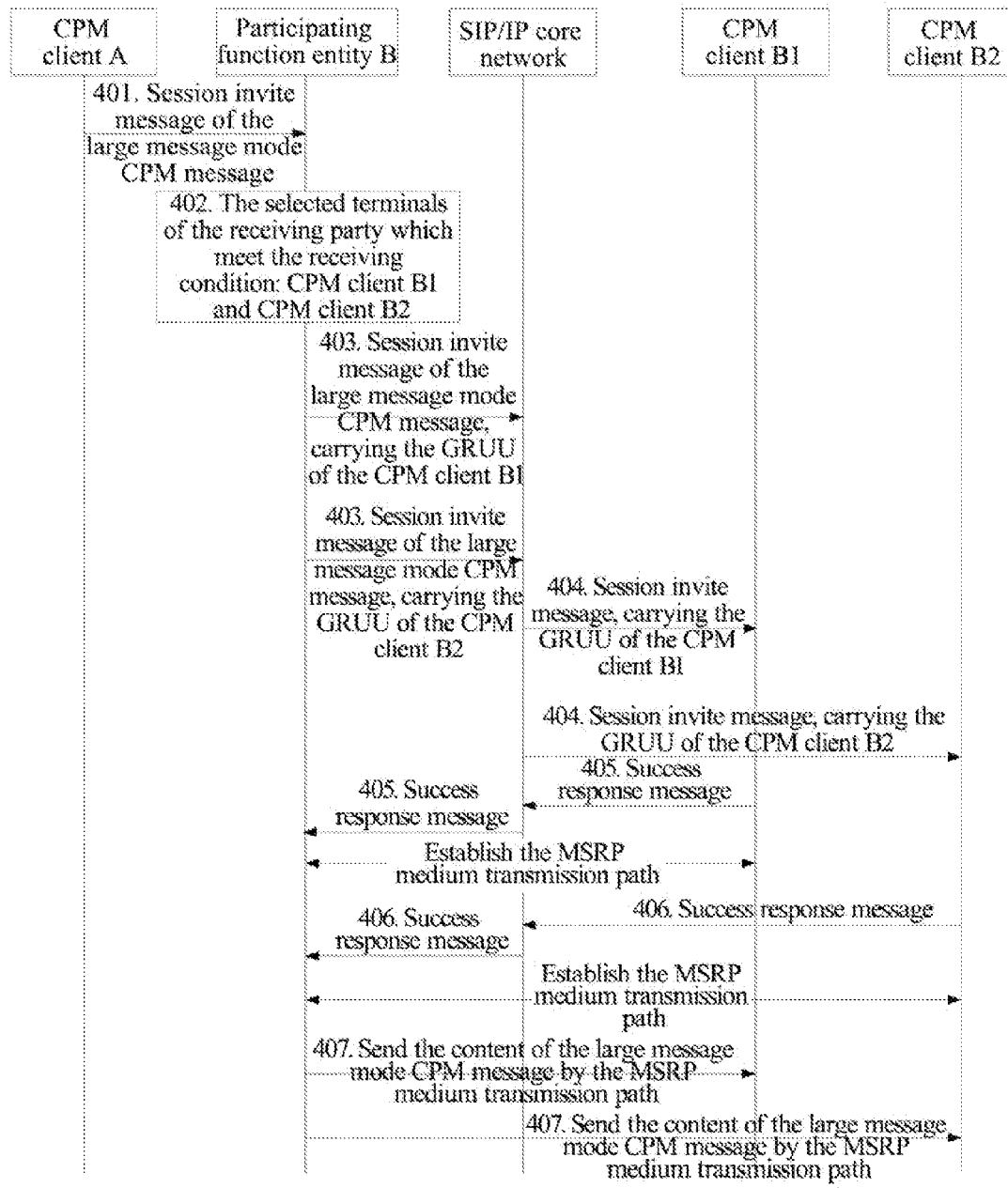
FIG. 4 is a flowchart of a method for routing a large message mode CPM message according to an embodiment of the present invention.

In this example, taking the user A sending a large message mode CPM message to the user B for an example, the CPM participating function to which the receiving party belongs performs the forking process on the received CPM message; and as shown FIG. 4, the example includes the following steps:

step S401: the CPM client A sends a session invite message of the large message mode CPM message to the user B, and the session invite message is routed to the PF-B by the PF-A.

Step S402: the PF-B receives the session invite message of the large message mode CPM message, the PF-B performs the screening process on the receiving clients according to the receiving condition, and finally the selected receiving CPM clients that meet the receiving condition are the CPM client B1 and the CPM client B2;

the large message mode CPM message sent by the PF-B can be the real-time received session invite message of the large message mode CPM message from the sending party, or can be the non real-time large message mode CPM message.

Step S403: the PF-B sends the session invite message of the large message mode CPM message to the CPM client B1 and the CPM client B2;

specifically, the GRUU of the CPM client B1 is carried in the invite message sent to the CPM client B1; and the GRUU of the CPM client B2 is carried in the invite message sent to the CPM client B2;

the way of the session invite message carrying the GRUU may be, but not limit to, setting the field value of the Request-URI in the invite message to GRUU.

Step S404: the SIP/IP core network receives the session invite message sent by the PF-B, due to the field Request-URI carrying the GRUU, the SIP/IP core network no longer performs the forking process on that message, but routes the session invite message carrying the GRUU of the CPM client B1 to the CPM client B1, and routes the session invite message carrying the GRUU of the CPM client B2 to the CPM client B2.

Step S405: the CPM client B1, after receiving the invite message, returns a success response message, and that success response message is routed to the PF-B through the SIP/IP core network, till now, the SDP negotiation between the PF-B and the CPM client B1 is achieved; afterwards, the MSRP medium transmission path between the PF-B and the CPM client B1 is established;

in the step, the way for the SDP negotiation and establishing the MSRP medium transmission path between the PF-B and the CPM client B1 is the same as the related art;

step S406: the CPM client B2, after receiving the invite message, returns a success response message, and that success response message is routed to the PF-B through the SIP/IP core network, till now, the SDP negotiation between the PF-B and the CPM client B2 is achieved; afterwards, the MSRP medium transmission path between the PF-B and the CPM client B2 is established;

in the step, the way for the SDP negotiation and establishing the MSRP medium transmission path between the PF-B and the CPM client B2 is the same as the related art;

the order of executions of the step S405 and the step S406 is not limited.

Step S407: the PF-B sends the received content of the large message mode CPM message sent by the sending party to the CPM client B1 through the MSRP medium transmission path established to the CPM client B1;

the PF-B sends the received content of the large message mode CPM message sent by the sending party to the CPM client B2 through the MSRP medium transmission path established to the CPM client B2.

After the transmission of the medium content of the large message mode CPM message achieves, the sending CPM client initiates a finishing message of the large massage mode session, that message arrives at the PF-B through the SIP/Core, the PF-B sends the session finishing message to the CPM client B1 and the CPM client B2, and the way of sending a session finishing message to each CPM client is the same as the related art.

The embodiments take the CPM sending the large message for example. Due to sending other medium content such as document is the same as sending the large message, the solution provided by the present invention is also applied in the case that the SIP session is used as the signaling plane and the MSRP is used as the medium plane to transmit other medium content.

To sum up, by the above embodiments of the present invention, when a user uses the same correspondence address such as a CPM address to log in a communication system such as a CPM system by different clients, an instant message server such as the terminating participating function, when issuing an instant message such as the CPM message, sends the instant message to two or more clients that meet the receiving condition in the plurality of online clients. Thereby, the problem of routing when forwarding a 'one number more machines" message is solved, further, the transmission of messages in the communication system such as the CPM system is realized better, and improving the user experience.

Although the above description is described by taking the pager mode message and large message of the CPM system for example, the mentioned schemes of the present invention can also be applied to the instant message service or other instant message services (such as document transmission) based on the IMS system.

What we claim is:

1. A method for routing a pager mode converged IP messaging (CPM) message, comprising:
  when a terminating participating function needs to send a pager mode CPM message to a plurality of receiving CPM clients that meet a receiving condition, the terminating participating function sending a pager mode CPM message to each of the plurality of receiving CPM clients, wherein said each page mode CPM message sent by the terminating participating function carries a globally routable identification of the corresponding receiving CPM client of the a plurality of receiving CPM clients and said each pager mode CPM message being routed to the corresponding receiving CPM client through a SIP/IP core network;
  wherein:
  the terminating participating function obtains the globally routable identification of each receiving CPM client by any one of the following ways of:
  (a) after the SIP/IP core network receives a registration message sent by a receiving CPM client, allocating a globally routable identification for the receiving CPM client, and forwarding the registration message carrying the globally routable identification allocated for the receiving CPM client to the terminating participating function;
  (b) the terminating participating function requesting to subscribe registration states of users by sending a subscription message to the SIP/IP core network, and the SIP/IP core network, after receiving the subscription message, sending a subscription notification message to the terminating participating function; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

2. The method according to claim 1, wherein:
  the way of the pager mode CPM message carrying the globally routable identification by the terminating participating function is:
  for each pager mode CPM message to be sent, the terminating participating function setting a field value of a request universal resource identifier in the pager mode CPM message to the globally routable identification of the receiving CPM client.

3. A method for routing a large message mode converged IP messaging (CPM) message, comprising:

when a terminating participating function needs to send a session invitation message of a large message mode CPM message to a plurality of receiving CPM clients that meet a receiving condition, the terminating participating function sending a session invitation message of the large message mode CPM message to each of the plurality of receiving CPM clients, wherein each session invitation message of the large message mode CPM message sent by the terminating participating function carries a globally routable identification of the corresponding receiving CPM client of the plurality of receiving CPM clients, and said each session invitation message being routed to the corresponding receiving CPM client through a SIP/IP core network;

each receiving CPM client that receives the session invitation message achieving a session description protocol negotiation with the terminating participating function, and establishing a message session relay protocol, MSRP, medium transmission path to the terminating participating function;

the terminating participating function sending message content of a large message mode CPM message to each receiving CPM client through the respective MSRP medium transmission path;

wherein:

the terminating participating function obtains the globally routable identification of each receiving CPM client by any one of the following ways of:

(a) after the SIP/IP core network receives a registration message sent by a receiving CPM client, allocating a globally routable identification for the receiving CPM client, and forwarding the registration message carrying the globally routable identification allocated for the receiving CPM client to the terminating participating function;

(b) the terminating participating function requesting to subscribe registration states of users by sending a subscription message to the SIP/IP core network, and the SIP/IP core network, after receiving the subscription message, sending a subscription notification message to the terminating participating function; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

4. The method according to claim 3, wherein:

the way of the session invitation message of the large message mode CPM message carrying the globally routable identification by the terminating participating function is:

for each session invitation message to be sent, the terminating participating function setting a field value of a request universal resource identifier in the session invitation message to the respective globally routable identification of the receiving CPM client.

5. A system for routing a pager mode converged IP messaging (CPM) message, comprising a terminating participating function, a plurality of receiving CPM clients and a SIP/IP core network; wherein:

the terminating participating function is configured to, when a pager mode CPM message needs to be sent to the plurality of receiving CPM clients that meet a receiving condition, send a pager mode CPM message to each of the plurality of receiving CPM clients, wherein each pager mode CPM message sent by the terminating participating function carries a globally routable identification of a corresponding receiving CPM client of the plurality of receiving CPM clients;

the SIP/IP core network is configured to route said each pager mode CPM message to the corresponding receiving CPM client;

wherein:

the terminating participating function is further configured to send a subscription message to the SIP/IP core network to request to subscribe registration states of users, and obtain the globally routable identification of the CPM client from a received subscription notification message;

the SIP/IP core network is further configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

6. The system according to claim 5, wherein:

the pager mode CPM message sent by the terminating participating function is a real-time received pager mode CPM message from a sending party, or a non real-time pager mode CPM message.

7. The system according to claim 5, wherein:

the SIP/IP core network is further configured to, after receiving a registration message sent by a receiving CPM client, allocate a globally routable identification for the receiving CPM client, and forward the registration message carrying the globally routable identification allocated for the receiving CPM client to the terminating participating function;

the terminating participating function is further configured to obtain the globally routable identification of the receiving CPM client from the received registration message.

8. The system according to claim 5, wherein:

the pager mode CPM message carrying the globally routable identification by the terminating participating function is:

for each pager mode CPM message to be sent, the terminating participating function setting a field value of a request universal resource identifier in the pager mode CPM message to the globally routable identification.

9. A system for routing a large message mode converged IP messaging (CPM) message, comprising a terminating participating function, a plurality of receiving CPM clients and a SIP/IP core network; wherein:

the terminating participating function is configured to, when a session invitation message of a large message mode CPM message needs to be sent to the plurality of receiving CPM clients that meet a receiving condition, said terminating participating function sends a session invitation message to each of the plurality of receiving CPM clients, wherein said each session invitation message sent by the terminating participating function carries a globally routable identification of the corresponding receiving CPM client of the plurality of receiving CPM clients; and further configured to sends message content of the large message mode CPM message to each receiving CPM client of the plurality of receiving CPM clients through respective message session relay protocol (MSRP) medium transmission path;

the SIP/IP core network is configured to route said each session invitation message to the corresponding receiving CPM client;

the receiving CPM client is configured to, after receiving the session invitation message, achieves a session description protocol negotiation with the terminating participating function and establish the MSRP medium transmission path;

wherein:

the terminating participating function is further configured to send a subscription message to the SIP/IP core network to request to subscribe registration states of users, and obtain the globally routable identification of the CPM client from a received subscription notification message;

the SIP/IP core network is further configured to send the subscription notification message to the terminating participating function after receiving the subscription message; wherein, if a CPM client of a certain user among the subscribed users is registered, the subscription notification message carries the globally routable identification of the CPM client, and if a CPM client of a certain user among the subscribed users is not registered, the CPM client, after registering, sends the subscription notification message carrying the globally routable identification of the CPM client to the terminating participating function.

10. The system according to claim 9, wherein:

the SIP/IP core network is further configured to, after receiving a registration message sent by a receiving CPM client, allocate a globally routable identification for the receiving CPM client, and forward the registration message carrying the globally routable identification allocated for the receiving CPM client to the terminating participating function;

the terminating participating function is further configured to obtain the globally routable identification of the receiving CPM client from the received registration message.

11. The system according to claim 9, wherein:

the session invitation message of the large message mode CPM message carrying the globally routable identification by the terminating participating function is:

for each session invitation message to be sent, the terminating participating function setting a field value of a request universal resource identifier in the session invitation message to the respective globally routable identification of the receiving CPM client.

* * * * *